(12) United States Patent
Baseeth et al.

(10) Patent No.: US 12,256,752 B2
(45) Date of Patent: Mar. 25, 2025

(54) MICROEMULSIONS CARRYING ANTIOXIDANTS

(71) Applicant: Archer Daniels Midland Company, Decatur, IL (US)

(72) Inventors: Shireen Baseeth, Decatur, IL (US); Mark Matlock, Decatur, IL (US); Kirby Swinehart, Bethany, IL (US); Lori Wicklund, Argenta, IL (US)

(73) Assignee: ARCHER-DANIELS-MIDLAND COMPANY, Decatur, IL (US)

( * ) Notice: Subject to any disclaimer, the term of this patent is extended or adjusted under 35 U.S.C. 154(b) by 876 days.

(21) Appl. No.: 17/276,110

(22) PCT Filed: Sep. 13, 2019

(86) PCT No.: PCT/US2019/051059
§ 371 (c)(1),
(2) Date: Mar. 12, 2021

(87) PCT Pub. No.: WO2020/056293
PCT Pub. Date: Mar. 19, 2020

(65) Prior Publication Data
US 2022/0039418 A1 Feb. 10, 2022

Related U.S. Application Data

(60) Provisional application No. 62/731,375, filed on Sep. 14, 2018.

(51) Int. Cl.
| | | |
|---|---|---|
| A23D 7/005 | (2006.01) |
| A23D 7/01 | (2006.01) |
| A23L 3/3463 | (2006.01) |
| A23L 29/10 | (2016.01) |

(52) U.S. Cl.
CPC ............ *A23D 7/0053* (2013.01); *A23D 7/011* (2013.01); *A23L 3/3463* (2013.01); *A23L 29/10* (2016.08)

(58) Field of Classification Search
CPC ...... A23D 7/0053; A23D 7/011; A23D 9/007; A23D 9/013; A23L 3/3463; A23L 29/10; A23L 2/44; A23L 3/3472; A23L 29/04; A23F 3/16; C11B 5/0007; C11B 5/0085; C11B 5/0092; A23K 10/30; A23K 20/10; A23K 20/158
USPC ......................................................... 426/610
See application file for complete search history.

(56) References Cited

U.S. PATENT DOCUMENTS

| | | | | |
|---|---|---|---|---|
| 2,442,534 A | * | 6/1948 | Eckey ....................... C11C 3/10 |
| | | | | 554/167 |
| 2007/0085059 A1 | | 4/2007 | Mora-Gutierrez et al. | |
| 2007/0141222 A1 | * | 6/2007 | Binder ...................... C11B 5/00 |
| | | | | 426/601 |
| 2017/0325481 A1 | | 11/2017 | Chow et al. | |

FOREIGN PATENT DOCUMENTS

| | | | | |
|---|---|---|---|---|
| CN | 101878941 | | 11/2010 | |
| CN | 104012959 A | * | 9/2014 | ........... A23L 1/0315 |
| EP | 0884952 B1 | | 9/2001 | |

OTHER PUBLICATIONS

NPL SDS and SLS (Retrieved on Oct. 12, 2023). (Year: 2023).*
NPL Prajapati et al. (Pharm Res. 29: 285-309, 2012). (Year: 2012).*
Google search report [Retrieved on Apr. 5, 2024]. (Year: 2024).*

* cited by examiner

*Primary Examiner* — Bhaskar Mukhopadhyay
(74) *Attorney, Agent, or Firm* — Jesse S. Harper

(57) ABSTRACT

In each of its various embodiments, the present invention discloses microemulsions that carry antioxidants.

19 Claims, 13 Drawing Sheets

MICROEMULSIONS CARRYING ANTIOXIDANTS

CROSS-REFERENCE TO RELATED APPLICATIONS

This application is a national stage entry of International Application No. PCT/US19/51059, filed Sep. 13, 2019, which itself claims priority to U.S. Provisional Patent Application No. 62/731,375, filed Sep. 14, 2018, the contents of each are incorporated herein by reference.

TECHNICAL FIELD

The invention pertains to antioxidants.

BACKGROUND OF THE INVENTION

Lipid oxidation is a process that occurs in food systems from the free radical chain reaction of unsaturated fatty acids. The presence of the unsaturation in the fatty acid makes the fatty acid vulnerable to oxidation via such free radical reactions. Such reactions are a chain reaction including the steps of initiation, propagation, and termination. The presence of the oxidation in foods has a major impact on the shelf life of the food and can cause several off notes and even the presence of toxic products.

The effects of oxidation have been well studied. It been found that antioxidants can be effective in controlling lipid oxidation and/or slowing the rate of oxidation. Factors including temperature, pH, the presence of metals, the level of unsaturation, and/or others can lead to an increased oxidation rate. Thus, avoiding such factors can help control oxidation, but controlling such factors can be problematic. Thus, the use of antioxidants is another solution to control the oxidation.

Trace metals are good initiators of oxidation in food systems. Chelators function as preventive antioxidants by limiting the activity of catalytic metals present in the system, thus eliminating the initial oxidation step. Iron, copper and zinc are most commonly encountered in many foods and always a cause of concern in catalyzing oxidation.

Ethylene diamine tetra acetic acid (EDTA) in its sodium salt form is the most commonly used chelator to protect foods from autoxidation. Although this chelator is allowed by the US and WHO (World Health Organization), it cannot be used in the European Union (EU). Based on the mineral absorption in food, there is a concern on the use of EDTA although many of the emulsion type systems are still using about 75-100 ppm EDTA. It has found to be relatively more effective than any radical quenching antioxidant such as tocopherol.

Sodium tripolyphosphate (STPP) is a phosphate polymer allowed as food additive by Food and Drug Administration (FDA) as Generally recognized as safe (GRAS). STPP is commonly found in meat products and in addition to preventing the lipid oxidation, it is a potent water binder in emulsified systems.

Citric acid is most commonly used in foods as an acidulant in its salt form and acts as a potent metal chelator. Citric acid and its salts are widely accepted as food additive by the EU, US and WHO, and are also considered as GRAS by FDA.

Ascorbic acid (AA) is a strong oxygen scavenger. Transition metals have also been suggested to increase the ability of AA to decrease dissolved oxygen. This suggests a rapid creation of anaerobic environment within the food system. Thus, it is important to determine the effect of metals on both AA degradation and depletion of dissolved oxygen. It is always a challenge to keep the functionality of the AA as a free radical scavenger without causing it to be a prooxidant from AA degradation.

The other non-traditional metal chelators that have effect on lipid oxidation are phytic acid, phospholipids and flavonoids.

Although many synthetic and metal antioxidants exist, there is a desire to replace such synthetic and metal antioxidants with natural antioxidants that have a "clean label." With the exception of the tocopherols, the natural antioxidants are mostly water soluble, plant-based extracts. Such water soluble, plant-based extracts may be made oil soluble by adding emulsifiers. However, such compositions are often limited by the amount of water soluble, plant-based extracts that can be solubilized.

What is desired is system that has a high load of water soluble, plant-based extract, that is good efficacy, and yet is still able to interface in an oil system.

SUMMARY OF THE INVENTION

In each of its various embodiments, the present invention fulfills this need and discloses microemulsions that include plant-based extracts that are water or oil soluble.

A microemulsion comprising a plant-based antioxidant, an organic acid, water, at least one surfactant, and a non-polar solvent is disclosed.

A method of preventing or slowing oxidation in a food/feed product or food/feed ingredient includes incorporating the microemulsion with the food/feed product or food/feed ingredient.

A process of loading a microemulsion with an antioxidant includes mixing an antioxidant with an organic acid and water, thus producing an aqueous phase, mixing a non-polar solvent with at least one surfactant, thus producing a non-polar phase, and mixing the aqueous phase with the non-polar phase, thus producing the microemulsion.

DETAILED DESCRIPTION OF THE INVENTION

Figure 1:
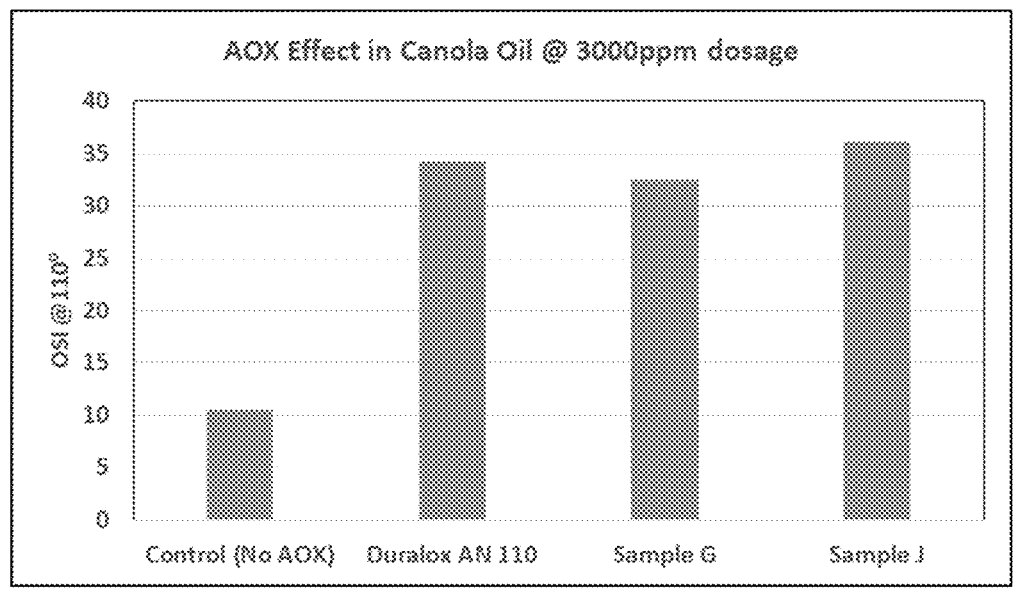
FIG. 1 shows the oxidative stability index of oil containing an antioxidant containing microemulsion and other compositions.

The present invention discloses a microemulsion comprising a plant-based antioxidant, an organic acid, water, at least one surfactant, and a non-polar solvent. The plant-based antioxidant may be water soluble or oil soluble. The plant-based antioxidant may be green tea extract, mint extract, rosemary, apple, acerola, olive, curcumin, limonene, phenolic acids, phenolic diterpenes, flavonoids, volatile oils, and combinations of any thereof.

The at least one surfactant may be lecithin and possibly include a co-surfactant. The co-surfactant may be mono and diglycerides, polysorbates, sorbitan esters, polyglyceril esters, sucrose esters, alkyl polyglucosides, alkyl polyglycosides, polaxmers, pluronics, ethoxylated fatty acids, ethoxylated monoglycerides, propylene glycol, polyethylene glycol esters, sodium dodecyl sulfate (SDS), sodium lauryl sulfate (SLS), quillaja, rhamnolipids, sophorolipids, sucrose esters, polyglycerol esters, saponins, derivatives of any thereof, and combinations of any thereof.

The organic acid may be ascorbic acid, citric acid, lactic acid, and combinations of any thereof.

The non-polar solvent may be vegetable oil, medium chain triglycerides, and combinations thereof.

The microemulsion may also include a chelator. Suitable chelators may be ethylene diamine tetra acetic acid, citric acid, ascorbic acid, phytic acid, phospholipids, flavonoids, and combinations of any thereof.

A method of preventing or slowing oxidation in a food/feed product or food/feed ingredient includes incorporating the antioxidant containing microemulsion of the present invention with the food/feed product or the food/feed ingredient.

The food/feed product or the food/feed ingredient may be an oil or a fat. The antioxidant may be present in the food/feed product or the food/feed ingredient at a concentration of between about 500 ppm and 4000 ppm or between about 100 ppm and 4000 ppm.

A chelator may be mixed with the food/feed product, the food/feed ingredient, the microemulsion, or combinations of any thereof.

Use of the antioxidant microemulsion of the present invention in preventing or slowing oxidation in a food/feed product or a food/feed ingredient is also disclosed.

A process of loading a microemulsion with an antioxidant includes mixing an antioxidant with an organic acid and water, thus producing an aqueous phase, mixing a non-polar solvent with at least one surfactant, thus producing a non-polar phase, and mixing the aqueous phase with the non-polar phase, thus producing the microemulsion.

The antioxidant may be green tea extract, mint extract, rosemary, apple, acerola, olive, curcumin, limonene, phenolic acids, phenolic diterpenes, flavonoids, volatile oils, and combinations of any thereof.

The antioxidant may be a water soluble, plant-based antioxidant or an oil soluble, plant-based antioxidant.

The organic acid may be ascorbic acid, citric acid, lactic acid, and combinations of any thereof.

The at least one surfactant may be lecithin and a co-surfactant.

The non-polar solvent may be a vegetable oil, medium chain triglycerides, and combinations thereof.

The efficacy of an antioxidant comes from the manner in which the antioxidant is delivered in the oil. At similar concentrations of antioxidant, an emulsifier blended antioxidant behaves differently than a nanodispersion containing the antioxidant. The differences can come from the significant change in particle size and surface area.

The presence of water in the formulation also has an effect on the stability and functionality of the antioxidant. Water soluble plant-based antioxidants such as carnosic acid, carnasol, green tea extracts, hydroxyl tyrosol, and others can lose their efficacy over time in the presence of moisture, air, and temperature, which can have a huge effect on product shelf life.

The microemulsions of the present invention that include plant-based extracts add significant value to not only production functionality, but also towards extending the shelf life of products that such microemulsions are incorporated. Thus, microemulsions including the plant-based extracts provide a good advantage in products where the active ingredient (i.e., antioxidants, vitamins, minerals, probiotics, colors, flavors and other functional nutraceuticals) is encapsulated.

Antioxidants that may be incorporated in the microemulsions described herein include, but are not limited to, green tea extract, mint extract, rosemary, apple, acerola, olive, curcumin, limonene, phenolic acids (i.e., gallic, protocatechuic, caffeic, rosamarinic), phenolic diterpenes (i.e., carnasol, carnosic acid, rosamanol, rosmadial), flavonoids (i.e., quercetin, catechin, naringenin, kaepferol), volatile oils (i.e., eugenol, carvacrol, thymol, menthol), and combinations of any thereof.

A microemulsion is a system of water, oil, and a surfactant that spontaneously forms, and is an optically isotropic and thermodynamically stable low viscosity solution. Depending on the makeup of the microemulsion, the microemulsion may form a water-in-oil or an oil-in-water bicontinuous system. The surfactant may also include a co-surfactant such as a small chain alcohol or ester. Such self-emulsifying antioxidant containing microemulsions may also be used to carry bioactives in food applications.

The plant-based antioxidant containing microemulsions that are water soluble may also be formulated to be soluble in oil and protect the oil from lipid oxidation.

The plant-based antioxidant containing microemulsions may include mono/diglycerides from medium chain triglycerides, lecithin, ascorbic acid, green tea extract, and mixed tocopherols. Such formulation when encapsulated is very shelf stable over a year, with no change in efficacy of the antioxidant. The plant-based extract microemulsions were evaluated with and without lecithin, and the functionality of the plant-based extract microemulsion was significantly higher with the lecithin. The green tea extract may be supplemented or replaced with other water-soluble extracts such as an active polyphenol including, but not limited to, rosemary or mint extract. Such plant-based extract microemulsions are infinitely soluble in medium chain triglycerides which enables the concentration of the active ingredients to be altered to a low dosage.

The plant-based antioxidant containing microemulsion allows at least one water soluble ingredient to easily be solubilized in a core of water in a reverse microemulsion. More than water soluble ingredient may be incorporated into the plant-based antioxidant containing microemulsions. Very high loading of the water-soluble ingredients may be achieved with minimal water in the plant-based antioxidant containing microemulsions. Such plant-based antioxidant containing microemulsions also enable the incorporation of actives that have an extreme pH and/or salt condition.

The plant-based antioxidant containing microemulsions may also act as a universal solvent that may have dual solubility in water and oil systems, which helps limit the number of formulations required in different applications. The plant-based antioxidant containing microemulsions may also hold water soluble and water insoluble ingredients at the same time such as, for example, a water-soluble antioxidant and a water insoluble antimicrobial component.

A plant-based antioxidant containing microemulsion including sodium lactate can provide an antimicrobial effect as well as helping with lowering the darkening of meat products caused by oxidation.

The plant-based antioxidant containing microemulsions may also be free of ethanol, propylene glycol, and/or polysorbates.

It should be understood that this invention is not limited to the embodiments disclosed in this summary, or the description that follows, but is intended to cover modifications that are within the spirit and scope of the invention, as defined by the claims.

Other than in the examples described herein, or unless otherwise expressly specified, all of the numerical ranges, amounts, values and percentages, such as those for amounts of materials, elemental contents, times and temperatures of reaction, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains error necessarily resulting from the standard deviation found in its underlying respective testing measurements. Furthermore, when numerical ranges are set forth herein, these ranges are inclusive of the recited range end points (i.e., end points may be used). When percentages by weight are used herein, the numerical values reported are relative to the total weight.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. The terms "one," "a," or "an" as used herein are intended to include "at least one" or "one or more," unless otherwise indicated.

Any patent, publication, or other disclosure material, in whole or in part, that is said to be incorporated by reference herein in its entirety is incorporated herein only to the extent that the incorporated material does not conflict with existing definitions, statements, or other disclosure material set forth in this disclosure. As such, and to the extent necessary, the disclosure as explicitly set forth herein supersedes any conflicting material said to be incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Vitamins can also be included in the food product such as, but not limited to, niacin, iron, zinc, thiamine mononitrate (vitamin B1), riboflavin (vitamin B2), folic acid, tocopherol(s) (vitamin E), vitamin C, vitamin B6, vitamin B12, vitamin A, vitamin D, pantothenic acid and copper.

The present invention may be further understood by reference to the following examples. The following examples are merely illustrative of the invention and are not intended to be limiting. Unless otherwise indicated, all parts are by weight.

EXAMPLES

Example 1

A green tea extract microemulsion was produced. Green tea extract (available from Archer-Daniels-Midland Company, Decatur, IL) is a free-flowing powder, standardized to 90% polyphenols and 50% EGCG (Epigallocatechin Gallate). The product is very water soluble. 20-30% of the GTE along with 2-10% ascorbic acid or citric acid was dissolved in water, producing the water phase of the microemulsion. An oil-emulsifier phase was prepared with 30-70% CAPMUL 471 available from Abitec Corp., a C8/C10 coconut mono/diglyceride. The oil phase can include mixed tocopherols (DECANOX MTS 90, available from Archer-Daniels-Midland Company, Decatur, IL) and Soy lecithin (BEAKIN LV1, available from Archer-Daniels-Midland Company, Decatur, IL). Different formulations (A-F) are shown in Table. 1.

TABLE 1

Microemulsion Formulation (%)

| Sample | GTE | Ascorbic Acid | Water | Monoglyceride | Soy Lecithin/MTS 90 | MCT | GTE @2000 ppm dosage |
|---|---|---|---|---|---|---|---|
| A | 14.2 | 2.3 | 7.0 | 63.7 | 12.8 | 0.0 | 284 |
| B | 13.5 | 2.1 | 6.7 | 60.5 | 12.1 | 5.0 | 270 |
| C | 12.8 | 2.1 | 6.3 | 57.4 | 11.5 | 10.0 | 256 |
| D | 12.1 | 2.0 | 6.0 | 54.2 | 10.8 | 15.0 | 242 |
| E | 11.4 | 1.8 | 5.6 | 51.0 | 10.2 | 20.0 | 228 |
| F | 10.7 | 1.7 | 5.3 | 47.8 | 9.6 | 25.0 | 214 |

The Oxidative Stability Index (OSI) was determined. For Samples B and E, the OSI at 110° C. was 30.2 and these 2 samples had 5-15% less GTE as compared to Sample A, suggesting that the effectiveness of the OSI comes from the stability of the formulation.

Samples G-K were formulated with higher ascorbic acid concentrations to improve the efficacy of the GTE and enhance oxidative stability.

TABLE 2

Microemulsion Formulation (%)

| Sample | GTE | Ascorbic Acid | Water | Monos | Soy Lecithin | MTS 90 |
|---|---|---|---|---|---|---|
| G | 14.2 | 2.3 | 7.0 | 63.7 | 10.2 | 2.6 |
| H | 16.1 | 2.3 | 8.0 | 73.6 | 0.0 | 0.0 |
| I | 16.1 | 4.6 | 10.3 | 69.0 | 0.0 | 0.0 |
| J | 16.1 | 4.6 | 10.3 | 56.8 | 10.2 | 2.6 |
| K | 16.1 | 4.6 | 10.3 | 56.8 | 6.4 | 6.4 |

The antioxidant formulations were compared for functionality at 3000 ppm dosage in canola oil by OSI time. The results are shown in FIG. 1.

Figure 2:
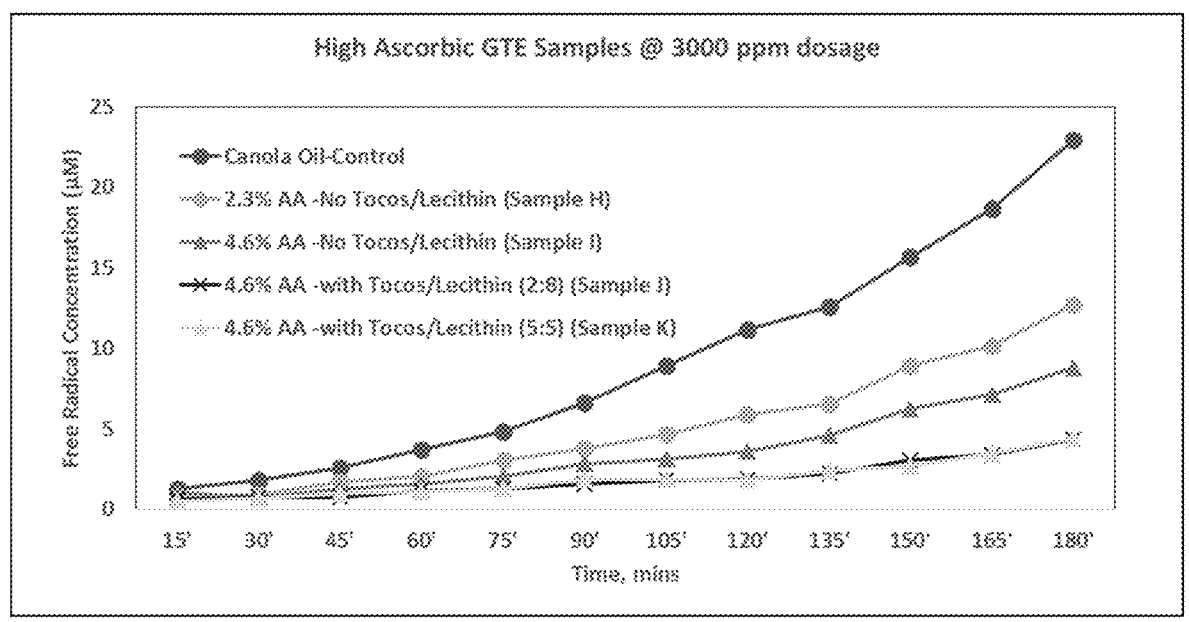
FIG. 2 shows the free radical concentration of oil containing an antioxidant containing microemulsion and other compositions over time.

EPR measurements were done for the GTE microemulsions to evaluate the oxidative stability of canola oil at 80 C for 3 hours. The results are shown in FIG. 2.

EPR measurements were carried out using a Bruker Bio-Spin Corp. (available from Billerica, Mass., USA) bench top Micro-ESR spectrometer. The analysis was done in 2 stages. As a first step, a calibration curve was done with TEMPO (2,2,6,6-tetramethyl piperidine-1-oxyl) a stable free radical. TEMPO was dissolved in canola oil by stirring at room temperature and was used as an external standard. TEMPO concentrations ranging from 2.5-20 µM in oil were prepared from a stock solution of TEMPO solution. These solutions were placed in the ESR tubes and the intensity was measured. The EPR intensity and the corresponding TEMPO concentrations were used to obtain a calibration curve. Knowing the intensity of the oil radical +PBN adduct, the free radical concentration was derived using the ELBA Software from Bruker's MicroESR.

To evaluate the effect of different antioxidants in canola oil, the following EPR method was followed with the use of a spin trap. Canola oil sample was dosed with four different antioxidants at 3000 ppm. 40 µL of a spin trap agent PBN (N-t-Butyl-α-phenylnitrone) was added to 1 ml of the canola oils dosed with antioxidants, including a control sample with no antioxidant added. Each of the lipid samples were filled in ESR tubes and placed in heating block at 80° C. Every 15 minutes, each of the ESR tubes were placed in the MicroESR spectrometer and the intensity was measured.

The analysis was continued for a period of 3 hours and EPR intensity/Free radical concentration (µM) vs time was plotted to obtain the lag time of the canola oil both with and without the antioxidants. The comparison of the amount of free radical concentration at T 175 (175 minutes) provides the efficacy of the antioxidant in the study.

Figure 3:
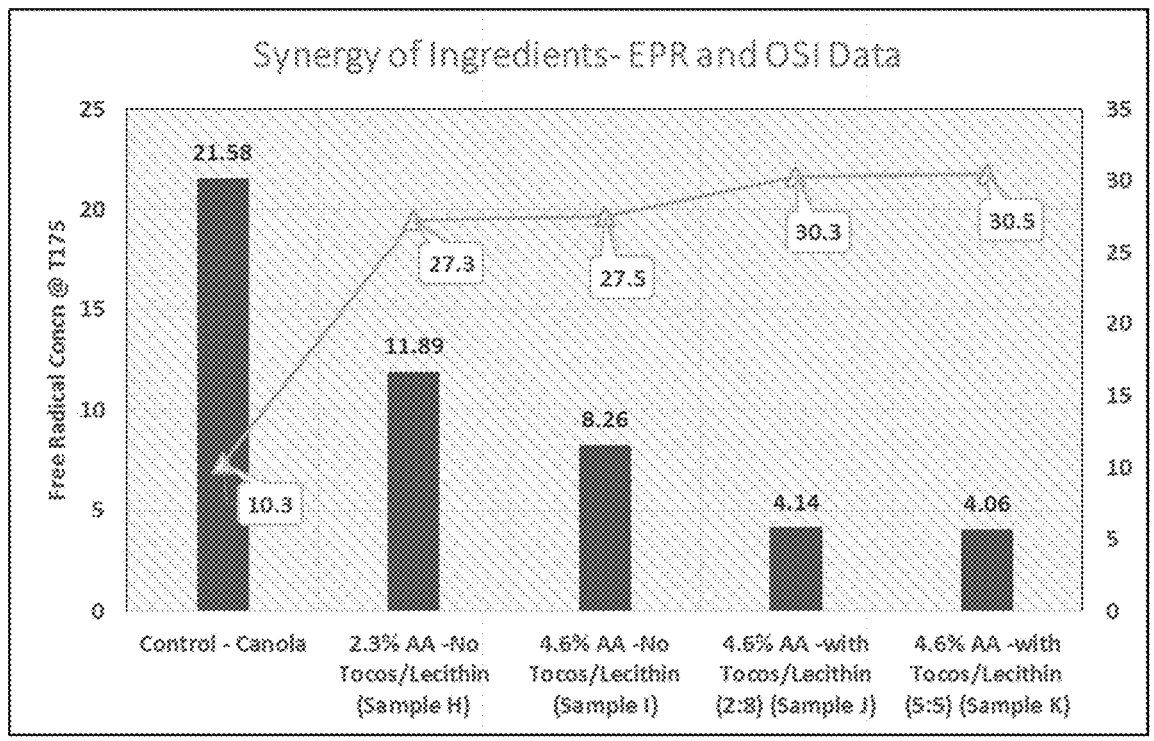
FIG. 3 shows the free radical concentration of oil containing an antioxidant containing microemulsion and other compositions.

FIG. 3 shows the effect of the synergy of ingredients from the EPR study that measured the free radical concentration of the canola oil at 80° C. In the absence of lecithin and mixed tocopherols (Sample I), a small increase in the ascorbic acid vs Sample H did help reduce the free radical concentrations in the oil. However, both the EPR and the OSI study do show a synergy obtained with lecithin, tocopherols, green tea, and ascorbic acid.

Example 2

Figure 4:
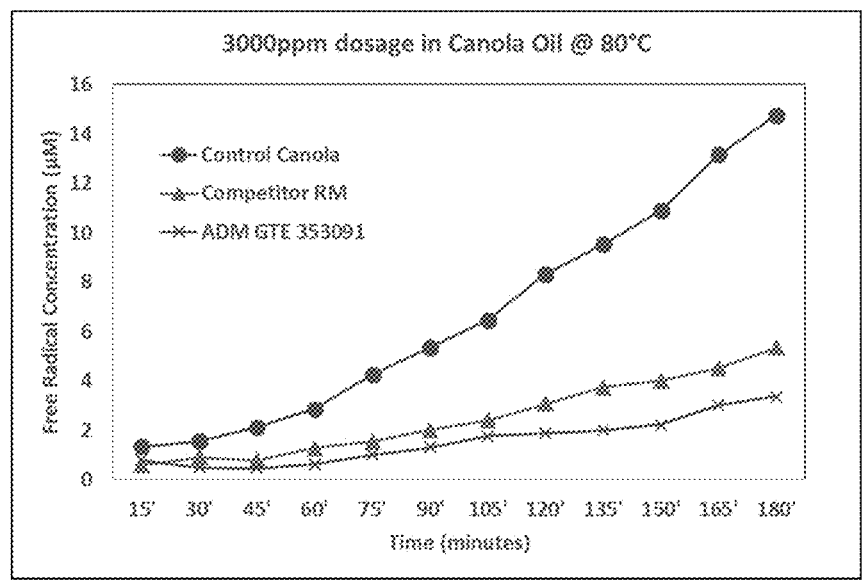
FIG. 4 shows the free radical concentration of oil containing an antioxidant containing microemulsion and other compositions over time
Figure 5:
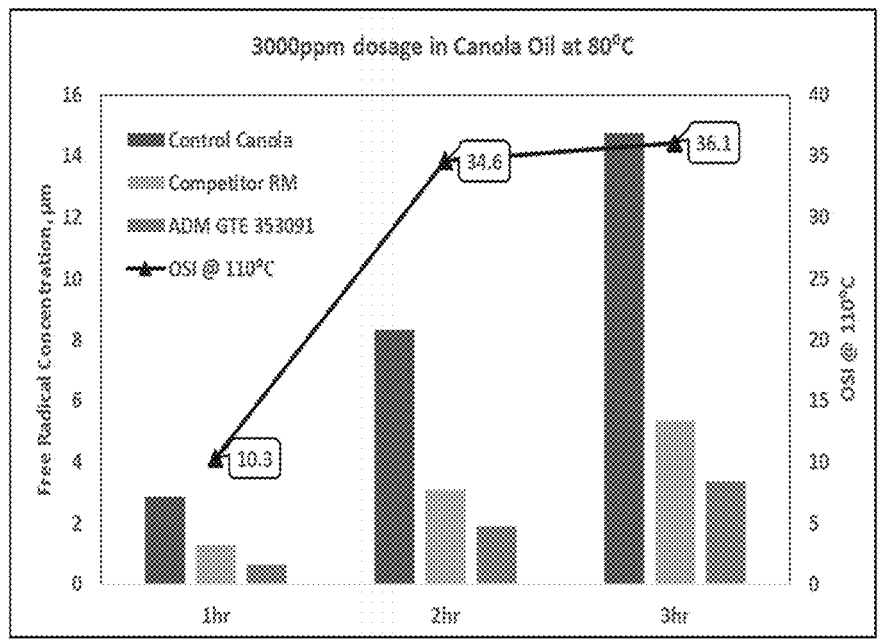
FIG. 5 shows the free radical concentration of oil containing an antioxidant containing microemulsion and other compositions over time.

Two of the commercial leading industry standards of antioxidants were compared to the antioxidant containing microemulsions disclosed herein. The industry standards that were evaluated were rosemary and the rosemary/green tea extract antioxidant. FIGS. 4 and 5 show the comparison of the EPR and OSI data showing the functionality of the industry standard antioxidants compared to the antioxidant containing microemulsion disclosed herein.

Example 3

In this Example, the antioxidant containing microemulsion disclosed herein was compared to commercially available antioxidants to assess the oxidative stability of soybean oil, canola oil, and NuSun oil. The oil storage evaluations were conducted in an oven according to the Schaal Oven test. The oils were stored in halfway closed, amber Qorpak glass jars at 565° C. in an air forced oven. The fixed intervals, oil samples were withdrawn from the glass jars and a peroxide value (PV) was determined according to the AOCS official method Cd 8-53. After being withdrawn, the samples were nitrogen blanketed and frozen until ready for analysis. The peroxide value, fatty acid, para anisidine value, and OSI were analyzed.

Figure 6:
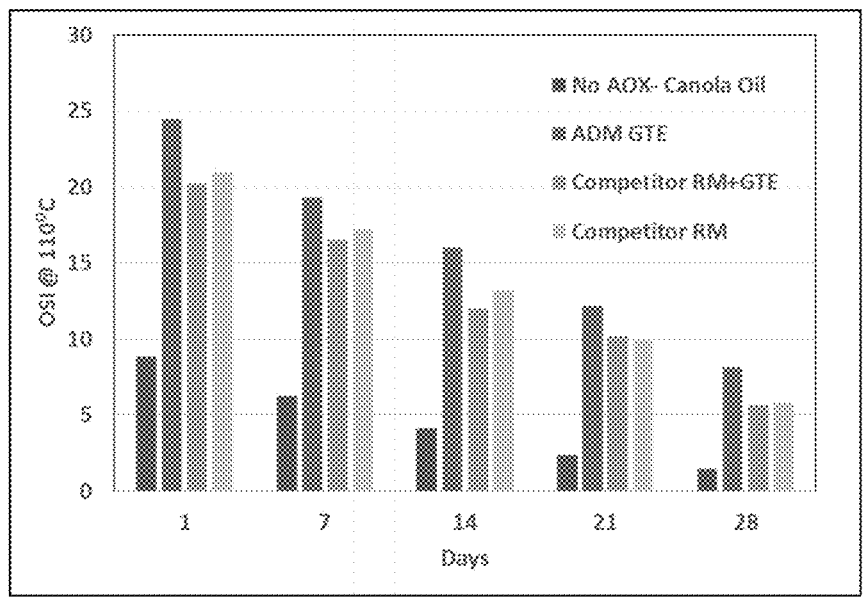
FIG. 6 shows the oxidative stability index of oil containing an antioxidant containing microemulsion and other compositions over time.
Figure 7:
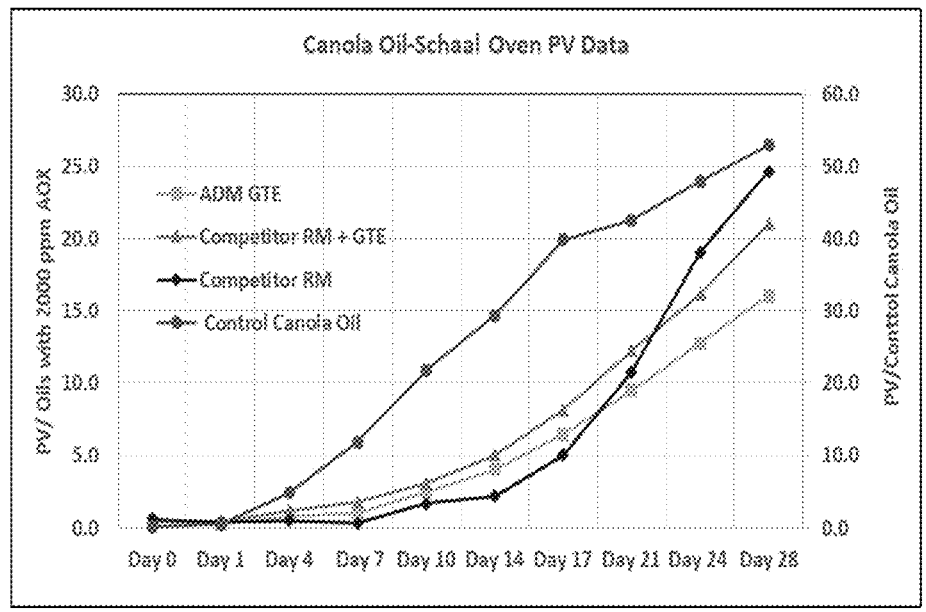
FIG. 7 shows the peroxide value of oil containing an antioxidant containing microemulsion and other compositions over time.
Figure 8:
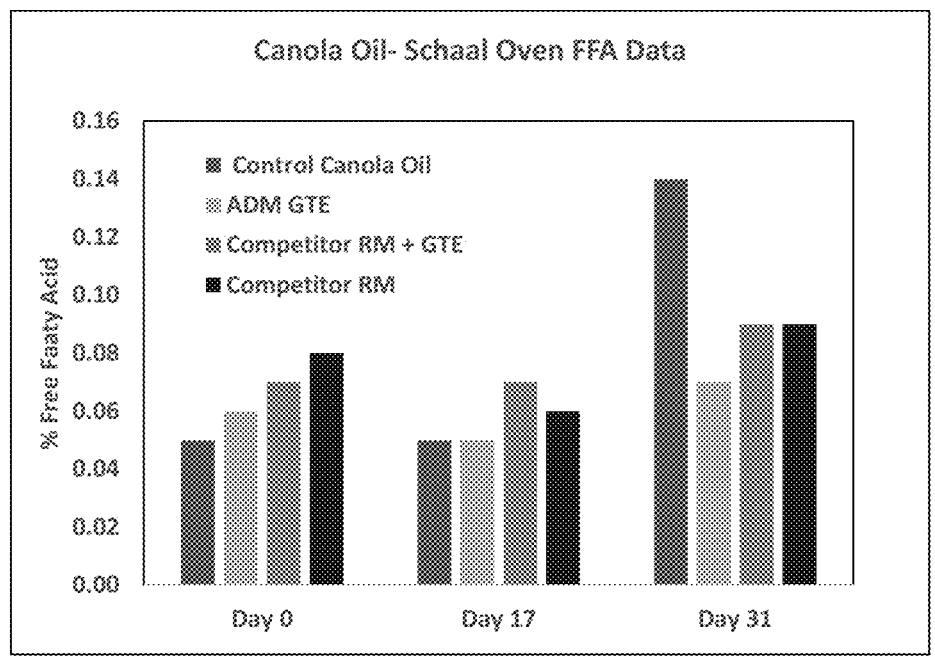
FIG. 8 shows the free fatty acid content of oil containing an antioxidant containing microemulsion and other compositions over time.

The OSI values obtained with canola oil are shown in FIG. 6. The peroxide values of canola oil are shown in FIG. 7. The free fatty acid values are shown in FIG. 8.

Figure 9:
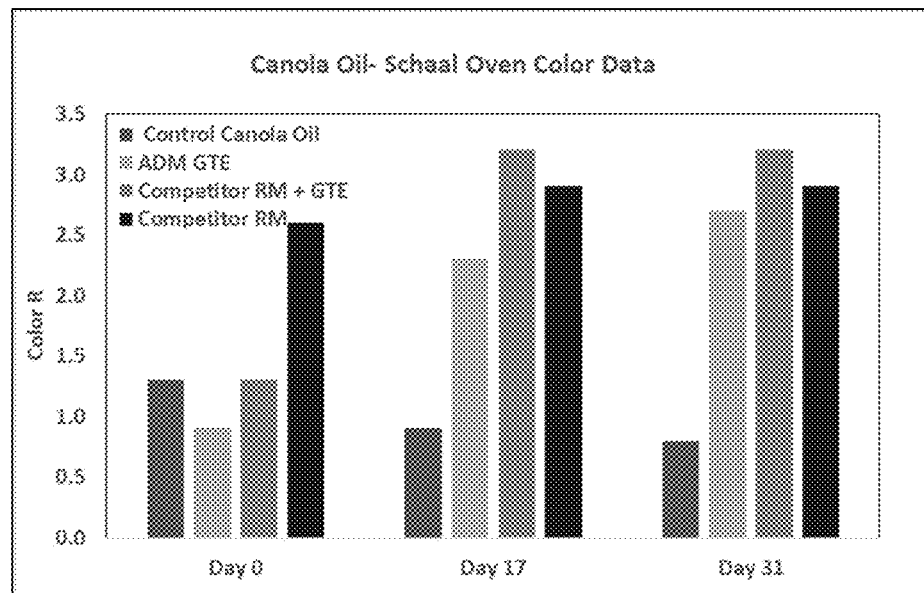
FIG. 9 shows the color of oil containing an antioxidant containing microemulsion and other compositions over time.

Green tea extracts exhibit strong red color in oils depending on the concentration. A higher loading capacity of the antioxidant containing microemulsions allows for very small sample inclusions in the oil to protect the oil. This enables a good protection of the oils from a low dosage, yet without having any added color to the oils. Data regarding such color is shown in FIG. 9.

Figure 10:
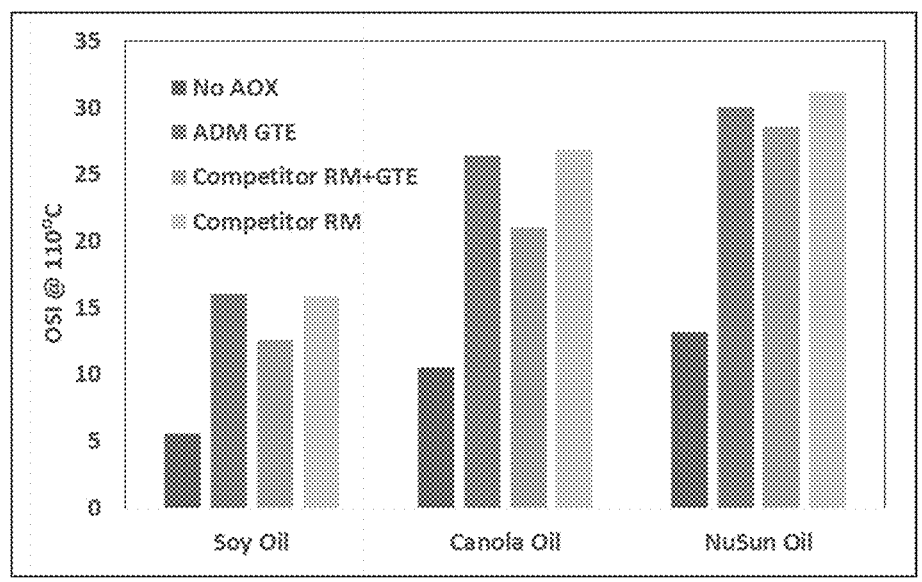
FIG. 10 shows the oxidative stability index of oil containing an antioxidant containing microemulsion and other compositions over time.
Figure 11:
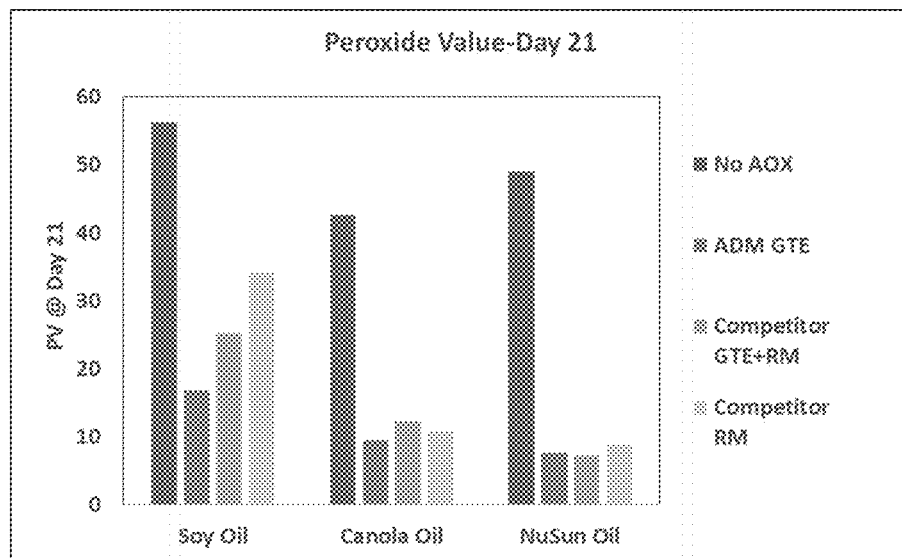
FIG. 11 shows the peroxide value of oil containing an antioxidant containing microemulsion and other compositions over time.
Figure 12:
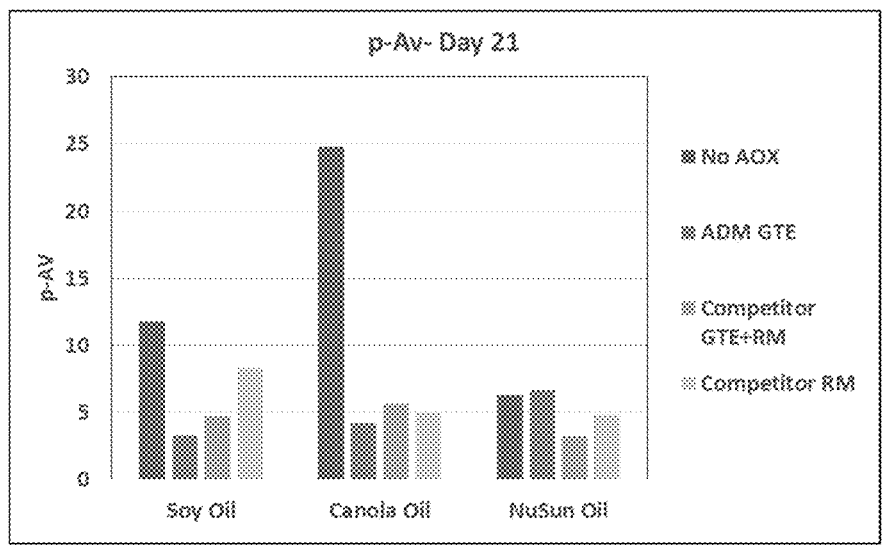
FIG. 12 shows the para-anisidine values of oil containing an antioxidant containing microemulsion and other compositions over time.

The OSI values obtained with soybean, canola, and Nusun oil are shown in FIG. 10. The peroxide values from the Schaal oven study of soybean, canola, and Nusun oils are shown in FIG. 11. The para-anisidine values form the Schaal oven evaluation of soybean, canola, and Nusun oils are shown in FIG. 12.

Overall, good stability was obtained for the antioxidant containing microemulsions with the three oils evaluated. As compared to the commercially available antioxidants, the green tea containing microemulsions described herein performed equal to or better, although the green tea containing microemulsions were based on a water-soluble green tea extract.

Example 4

Figure 13:
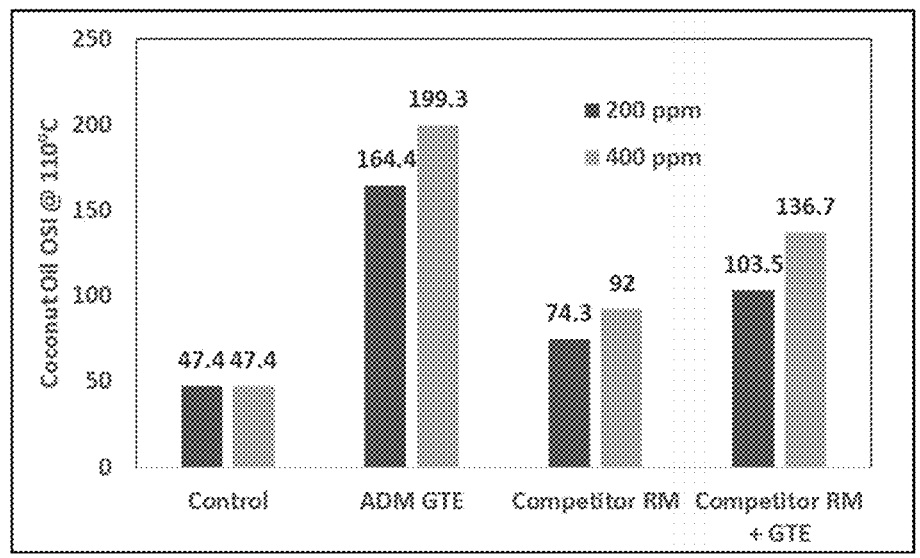
FIG. 13 shows the oxidative stability index of oil containing an antioxidant containing microemulsion and other compositions over time.
Figure 14:
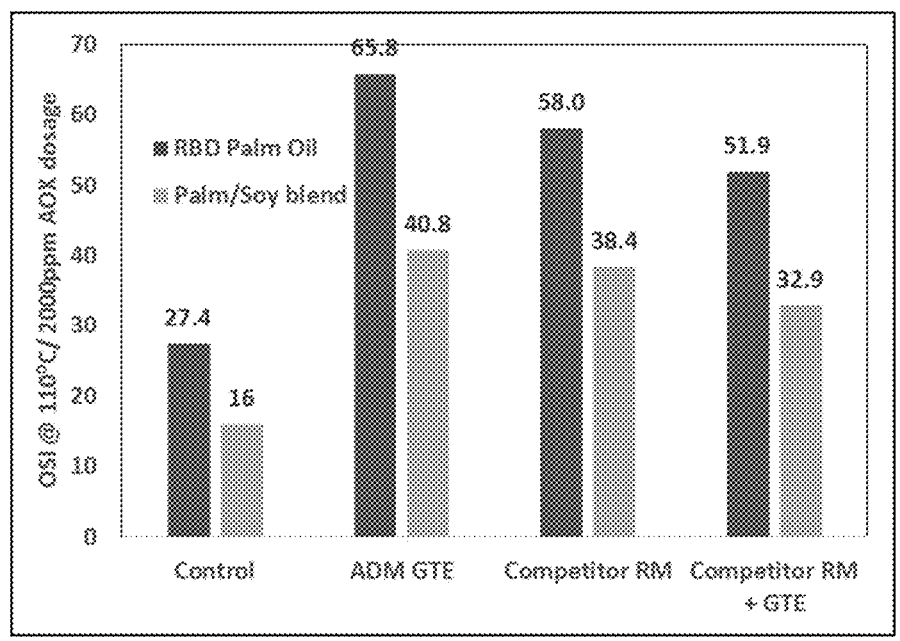
FIG. 14 shows the oxidative stability index of oil containing an antioxidant containing microemulsion and other compositions over time.

The ability of the antioxidant containing microemulsions described herein was also evaluated in comparison to commercially available rosemary products and rosemary/lipid soluble green tea blend in palm and coconut oil. FIG. 13 shows the oxidative stability in coconut oil and FIG. 14 shows the oxidative stability in palm oil and a palm/soy blend.

In the palm oil, the green tea containing microemulsions performed significantly better than the commercially available products. In the presence of TBHQ (a synthetic antioxidant) at 190 ppm, the palm oil OSI was 63.8. In the presence of TBHQ at 180 ppm, the palm/soybean oil blend OSI was 39. These results of the green tea containing microemulsions of FIG. 14 are very similar to the synthetic TBHQ.

Example 5

Figure 15:
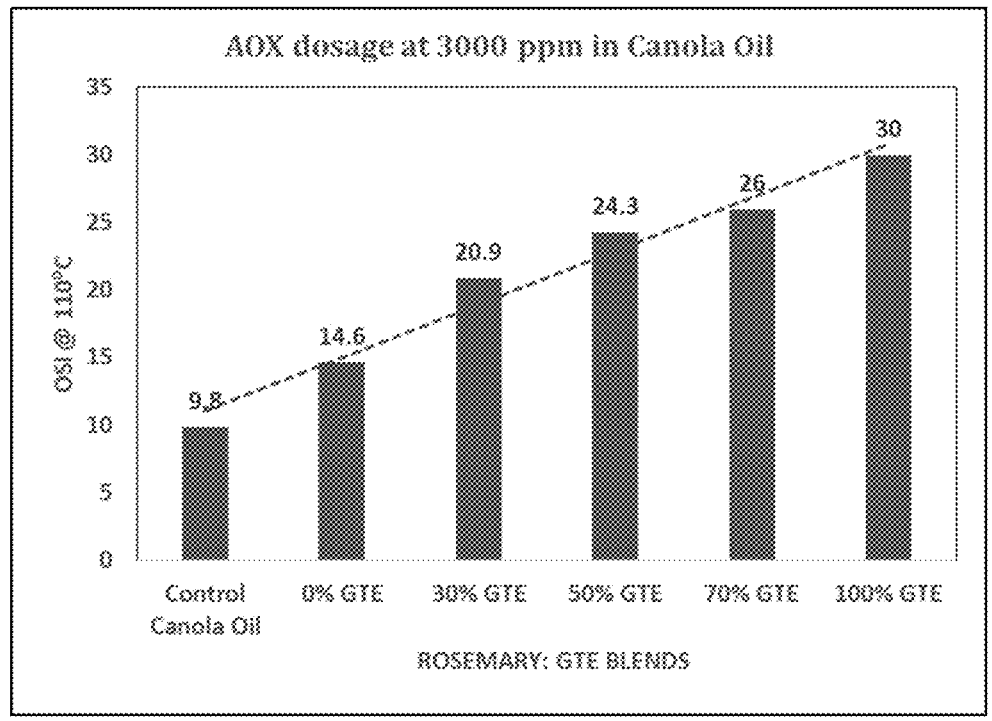
FIG. 15 shows the oxidative stability index of oil containing an antioxidant containing microemulsion and other compositions over time.

The green tea containing microemulsion (Sample A of Example 1) was blended with rosemary in a carrier oil as shown in FIG. 15. FIG. 15 shows that incorporating small amounts of rosemary in the green tea containing microemulsion does not show a synergistic result, but the overall increase in the OSI shows they the blends work well.

Example 6

Clear solutions of green tea containing microemulsions were prepared with minimal heating in the formulations of Table 3. These solutions were used as stock solutions to prepare the antioxidant formulations including ascorbic acid, lecithin, and mixed tocopherols.

TABLE 3

| | GTE stock solution | | | | |
|---|---|---|---|---|---|
| No. | GTE, g | Water, g | Monos, g | Total, g | % GTE |
| Sample A | 7 | 3 | 2 | 12 | 58.33 |
| Sample B | 7 | 3 | 1 | 11 | 63.64 |
| Sample C | 8 | 2 | 2 | 12 | 66.67 |

The effective concentrations of the green tea containing microemulsions was as high as 10-40%. Solubilizing such high concentrations of water-soluble ingredients in a formulation can be challenging, especially if the formulation is required to remain soluble in oil. The ascorbic acid, lecithin, and mixed tocopherols were included in the stock solutions as shown in Table 4.

TABLE 4

| % GTE Stock | GTE Solution | Ascorbic Acid | Monos | Lecithin | MTS 90 | % GTE | 2000 ppm | 1000 ppm |
|---|---|---|---|---|---|---|---|---|
| 58.33 | 39.0 | 2.4 | 48.8 | 4.9 | 4.9 | 22.8 | 455 | 228 |
| 63.64 | 39.0 | 2.4 | 48.8 | 4.9 | 4.9 | 24.8 | 497 | 248 |
| 66.67 | 39.0 | 2.4 | 48.8 | 4.9 | 4.9 | 26.0 | 520 | 260 |
| 58.33 | 58.5 | 2.4 | 29.3 | 4.9 | 4.9 | 34.1 | 683 | 341 |
| 63.64 | 58.5 | 2.4 | 29.3 | 4.9 | 4.9 | 37.3 | 745 | 373 |
| 66.67 | 58.5 | 2.4 | 29.3 | 4.9 | 4.9 | 39.0 | 781 | 390 |

Such highly concentrated microemulsions offer an advantage of lower the dosage level of a functional antioxidant in oil. Not only can the active ingredient (e.g., the antioxidant) be minimized, but the functionally inactive ingredients in the oil such as the emulsifiers can also be minimized.

The OSI data in canola oil for the sample with a GTE concentration of 25% was 37 hours at 110° C. The effective concentration of the GTE in a 2000 ppm dosage of the microemulsion is equivalent to approximately 500 ppm of effective GTE. Under similar formulation conditions and concentrations of other ingredients as compared to sample A corresponding to a 284 ppm GTE concentration, the OSI was 27 hours at 2000 ppm dosage in canola oil. A 10 hour increase with higher loading allows a lower dosage level of antioxidant in the oil. This provides couple of benefits on not just the economics of producing the formulations since plant-based extracts can be very expensive. A further benefit is a lower color contribution based on the nature of adding color to oil with the water-soluble green tea.

Example 7

Rosemary in oil was used to make microemulsions. Table 5 shows the rosemary containing microemulsions.

TABLE 5

| Sample No. | Amount of Rosemary in Oil | Ascorbic Acid | Monoglyceride | Lecithin | MTS 90 | Water |
|---|---|---|---|---|---|---|
| 1 | 40 | 0 | 35 | 20 | 0 | 5 |
| 2 | 40 | 2.5 | 35 | 20 | 0 | 2.5 |
| 3 | 40 | 2.5 | 35 | 16 | 4 | 2.5 |
| 4 | 40 | 4 | 32 | 15 | 0 | 4 |
| 5 | 45.5 | 4.5 | 34 | 11.5 | 0 | 4.5 |

Figure 16:
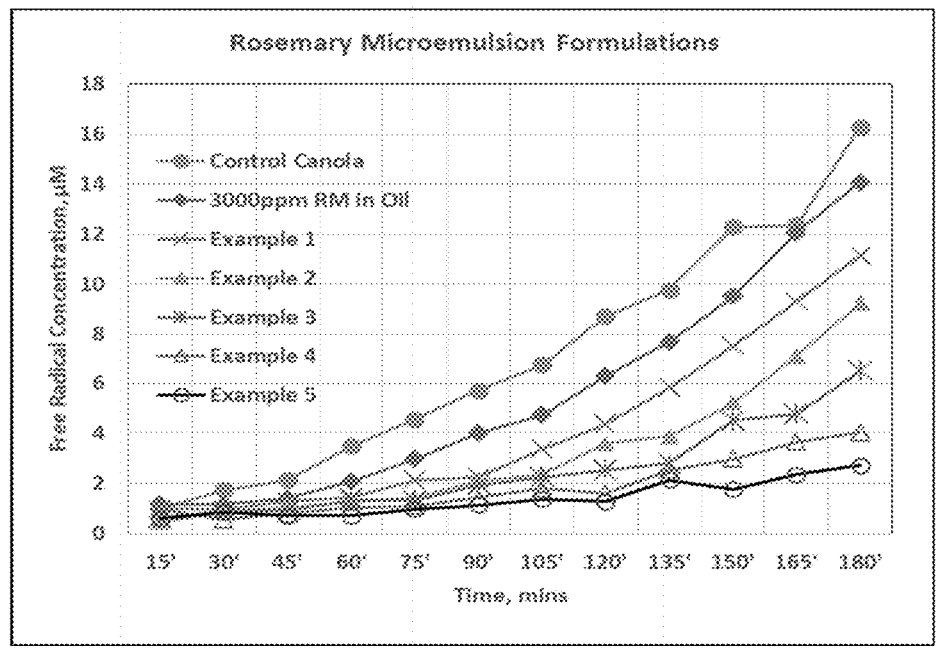
FIG. 16 shows the free radical concentration of oil containing an antioxidant containing microemulsion and other compositions over time.

The microemulsions of Table 5 were placed in canola oil and free radical concentrations were measured at various time intervals. The results are show in FIG. 16.

Rosemary in oil was used to make microemulsions of Table 6.

TABLE 6

| Sample No. | Amount of Rosemary in Oil | Ascorbic Acid | Monoglyceride | Canola Oil | Lecithin | Water |
|---|---|---|---|---|---|---|
| 7 | 42 | 4.2 | 33.7 | 0 | 15.8 | 4.2 |
| 8 | 42 | 4.2 | 34 | 12.4 | 3.2 | 4.2 |
| 9 | 70 | 4.2 | 17.6 | 0 | 4 | 4.2 |

Figure 17:
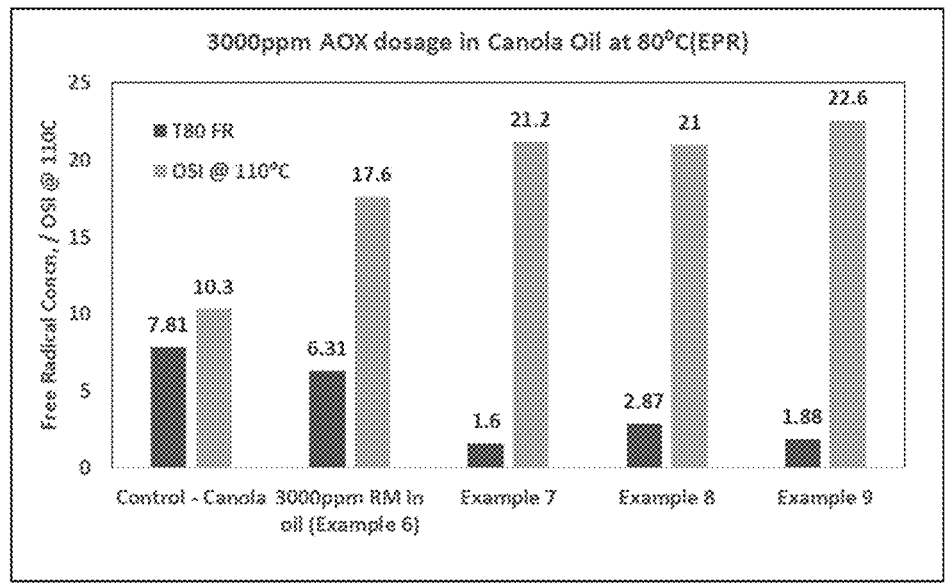
FIG. 17 shows the free radical concentration of oil containing an antioxidant containing microemulsion and other compositions over time.

The microemulsions of Table 6 were placed in canola oil and free radical concentrations in relation to the OSI at 110 C was determined as shown FIG. 17.

Example 8

Figure 18:
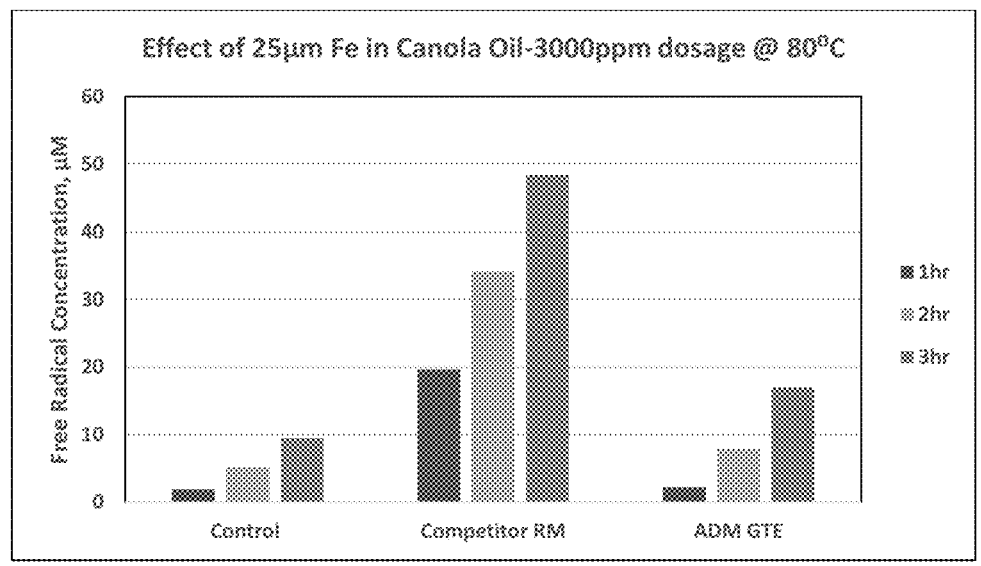
FIG. 18 shows the free radical concentration of Fe in oil containing an antioxidant containing microemulsion and other compositions.
Figure 19:
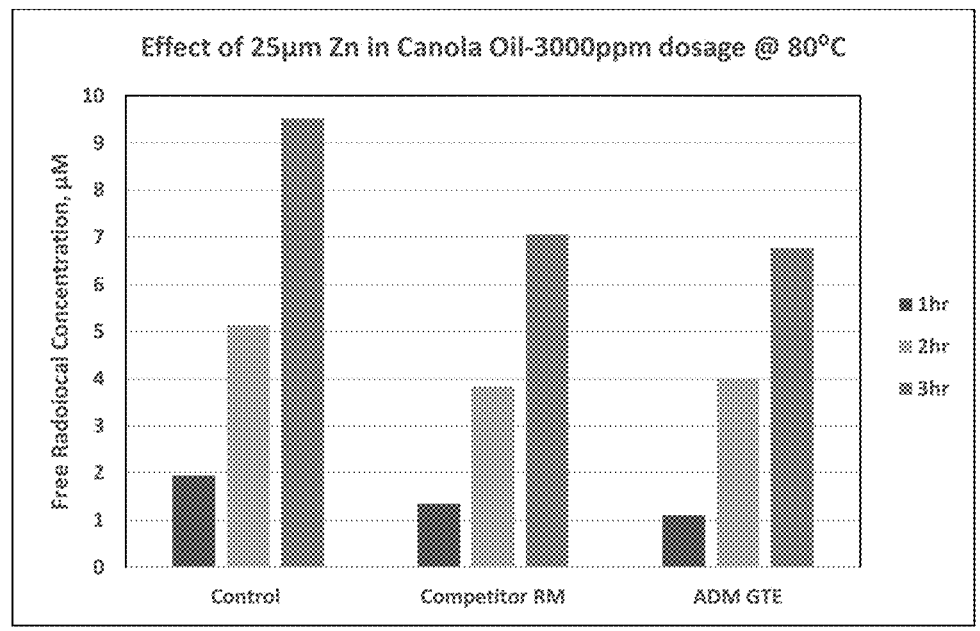
FIG. 19 shows the free radical concentration of Zn in oil containing an antioxidant containing microemulsion and other compositions over time.

Minerals are very good prooxidants and can act as catalyst in the oxidation process. Typically, metal chelating organic acids such as ascorbic and citric acid are used in combination with other antioxidants in order to mitigate the negative effect. An evaluation on the EPR was done with canola oil dosed with 25 μm iron and zinc chloride prepared as a micellar solution. Antioxidants were dosed at 3000 ppm in canola oil with Fe or Zn, and PBN was used as spin trap. Free radical concentration was measured as a function of time at 80° C. for a period of 3 hours to accelerate the oxidation process. FIGS. 18 and 19 show the effect of the antioxidants including the green tea containing microemulsion described herein. The green tea containing microemulsion is effective in controlling the effects of Fe and Zn to a greater extent than a commercially available rosemary product.

Example 9

Microemulsions including rosemary in oil and mint extract were prepared having the formulations as shown in Table 7.

TABLE 7

| Sample No. | Rosemary in oil | Canola lecithin | Monoglyceride | Ascorbic acid (50%) solution | Mint extract |
|---|---|---|---|---|---|
| 6 | 42.1 | 15.8 | 33.7 | 8.4 | 0 |
| 7 | 36.8 | 15.8 | 33.7 | 8.4 | 5.3 |
| 8 | 31.6 | 15.8 | 33.7 | 8.4 | 10.5 |

Figure 20:
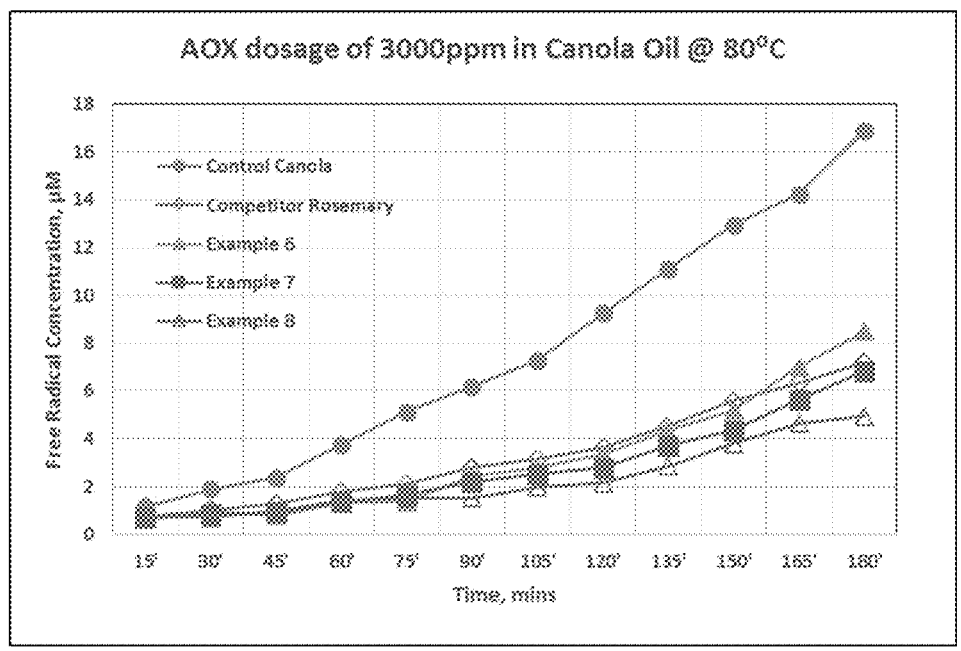
FIG. 20 shows the free radical concentration of oil containing an antioxidant containing microemulsion and other compositions over time.

Free radical concentration at various times intervals at 80° C. was determined and is shown in FIG. 20.

Example 10

Antioxidant formulations are usually designed for both water soluble and oil soluble systems. In order to accomplish this, multiple formulations are developed and delivered to the market based on specific applications. However, ideally a universal formulation that will work for both water and oil-based system can offer wide benefits not just based on the multiple inventories that is typically required, but also on understanding the robustness of the antioxidant functionality.

The water-based application systems have multiple components such as change in pH, ionic strength, and additives that can impact the oxidative stability of the lipid component, proteins etc. Antioxidant formulations designed for water soluble systems usually contain a carrier system for antioxidant active component like propylene glycol, medium chain triglycerides, vegetable oils etc. One of the most common issues encountered with such systems is the stability in the dispersion. When oil-based surfactant systems are dispersed in extreme pH and high salt (brine) conditions, the dispersion can easily phase separate and lead to poor protection of the lipids. Also, based on the HLB of food emulsifiers, there is a limited number of emulsifiers that can fit the food and feed category. In order to improve the formulation stability, nanoemulsified systems are needed that can tolerate high salt and extreme pH conditions, yet still form stable dispersions. Microemulsions provide such formulation stability in the presence of electrolytes that vary the surface characteristics of the emulsifier and provide good stability in water-based systems. The figure below shows the comparison of microemulsion vs neat emulsifier system with rosemary.

A rosemary containing microemulsion having 20-40% of the rosemary in oil was mixed with 70% of an emulsifier base having the following formulation: 20-70% of YELKIN SS brand lecithin (available from Archer-Daniels-Midland Company, Decatur, IL); 5-30% of polysorbate 80; 2-10% ascorbic acid; and 10-30% sodium lactate.

Figure 21:
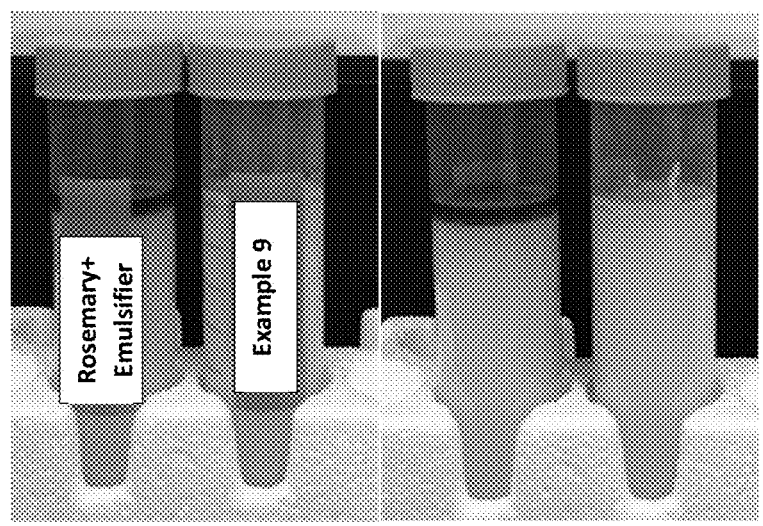
FIG. 21 shows the ability of the rosemary containing microemulsion of this Example to disperse in a brine solution as compared to a commercially available rosemary/emulsifier blend.

The oxidative stability of the rosemary containing microemulsion of this Example at 3000 ppm at 110° C. in canola oil was 19.8 hours as compared to a commercially available rosemary/emulsifier blend which was 15.6 hours. The sodium lactate improves the antimicrobial function and improves the effect of darkening on a meat product. FIG. 21 shows the ability of the rosemary containing microemulsion of this Example (labeled Example 9) to disperse in a brine solution as compared to a commercially available rosemary/emulsifier blend.

Example 11

Figure 22:
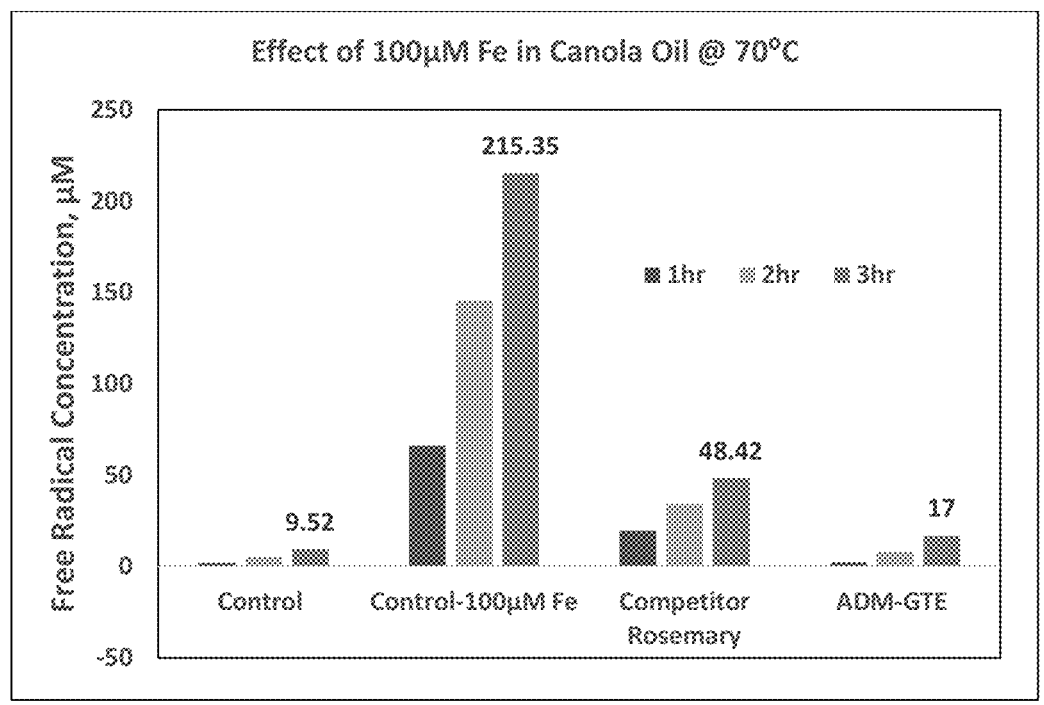
FIG. 22 shows the free radical concentration of oil having a metal and containing an antioxidant containing microemulsion and other compositions over time.
Figure 23:
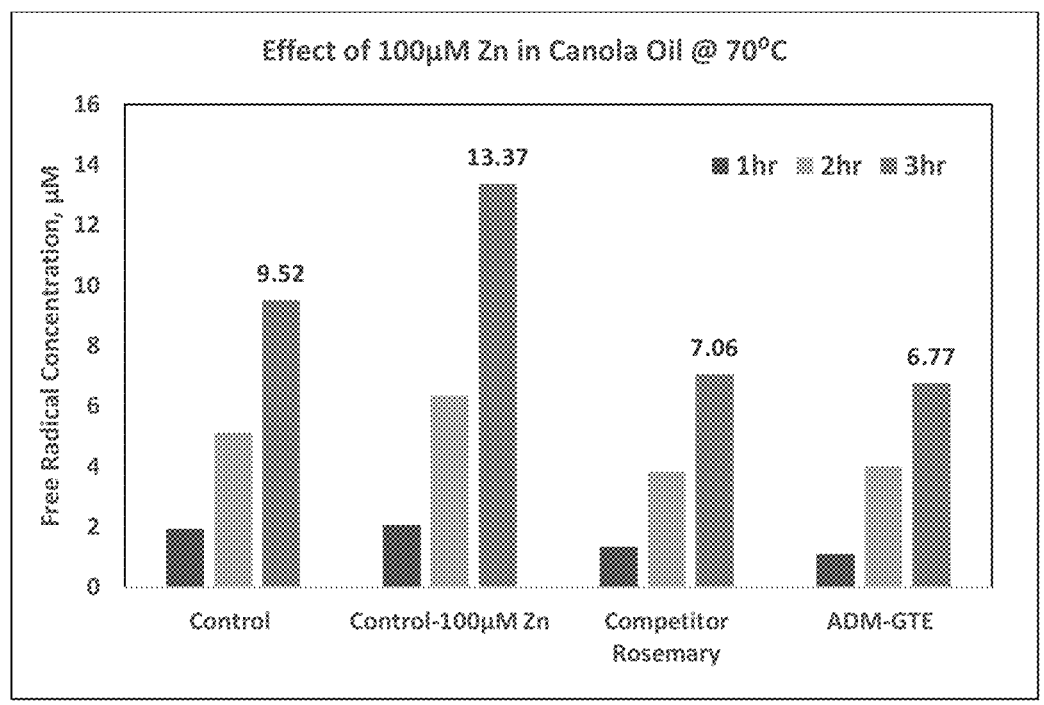
FIG. 23 shows the free radical concentration of oil having a metal and containing an antioxidant containing microemulsion and other compositions over time.

To demonstrate the effect of different antioxidants including ascorbic acid, EPR studies were carried out in presence of the trace metals iron and zinc. Canola oil was dosed with 100 µm Fe and 100 µm Zn for the EPR study. The oil samples were dosed with 40 µL PBN and samples were run to measure the intensity/free radical concentration at 70° C. FIGS. 22 and 23 show the effect of iron and zinc in canola oil. The Green tea extract containing microemulsion of the present invention was more effective for iron and zinc as compared to the commercially available rosemary blend.

Example 12

In order to demonstrate the partitioning of metals in an antioxidant system, an antioxidant containing microemulsion (AOX Blend 2), such as the antioxidant containing microemulsion of the present invention, was prepared and compared to a traditional emulsifier blend (AOX Blend 1). EPR and OSI methods were used in canola oil dosed with 6 ppm iron to the oil. The antioxidants were chosen to have the same amount of actives as shown in Table 8. No additional chelators were present. In the microemulsion composition, glycerol was the polar solvent in order to limit the effect of additional moisture.

TABLE 8

| Samples | Carnosol | Carnosic Acid |
| --- | --- | --- |
| AOX Blend 1 (emulsifier blend) | 0.21% | 1.89% |
| AOX Blend 2 (microemulsion) | 0.25% | 1.84% |

Figure 24:
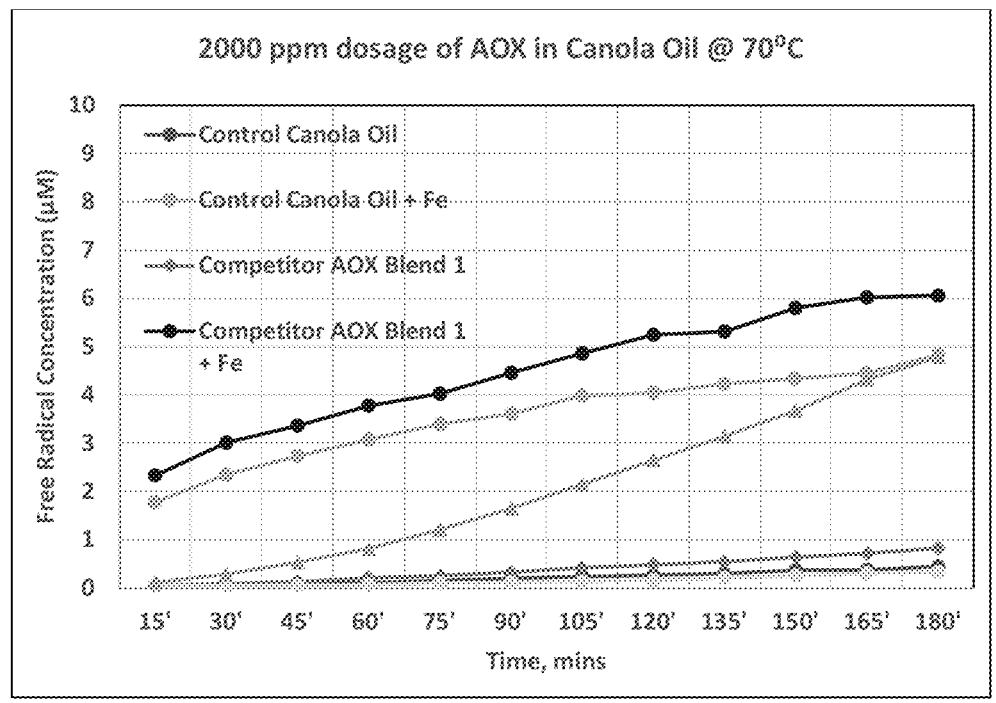
FIG. 24 shows the free radical concentration of oil having a metal and containing an antioxidant containing microemulsion and other compositions over time.

The free radical concentrations were measured as a function of time for canola oil at 2000 ppm antioxidant dosage with and without additional iron. The results are shown in FIG. 24.

Figure 25:
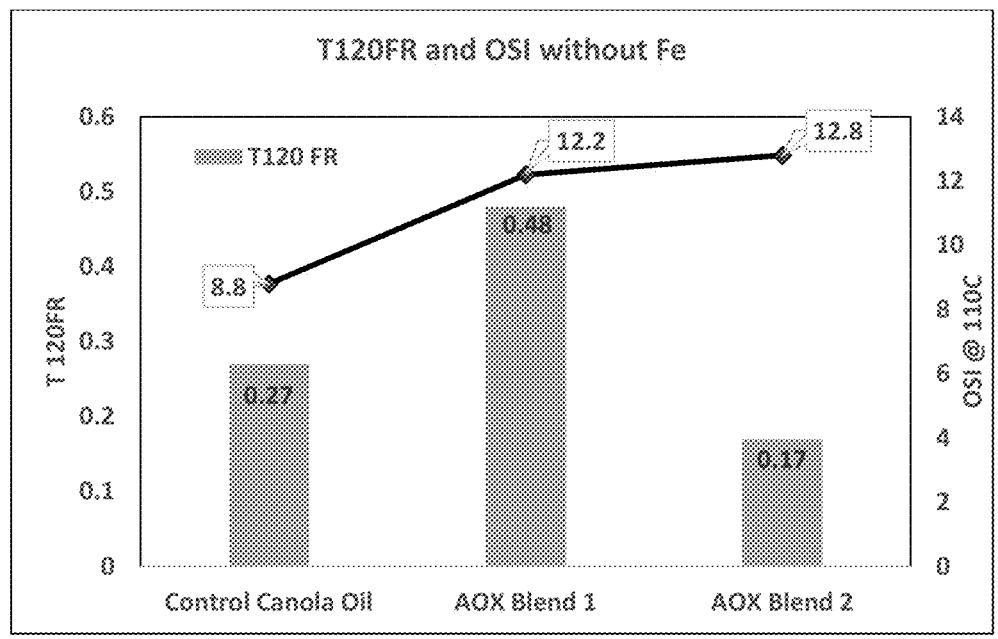
FIG. 25 shows the oxidative stability index of oil and containing an antioxidant containing microemulsion and other compositions over time.
Figure 26:
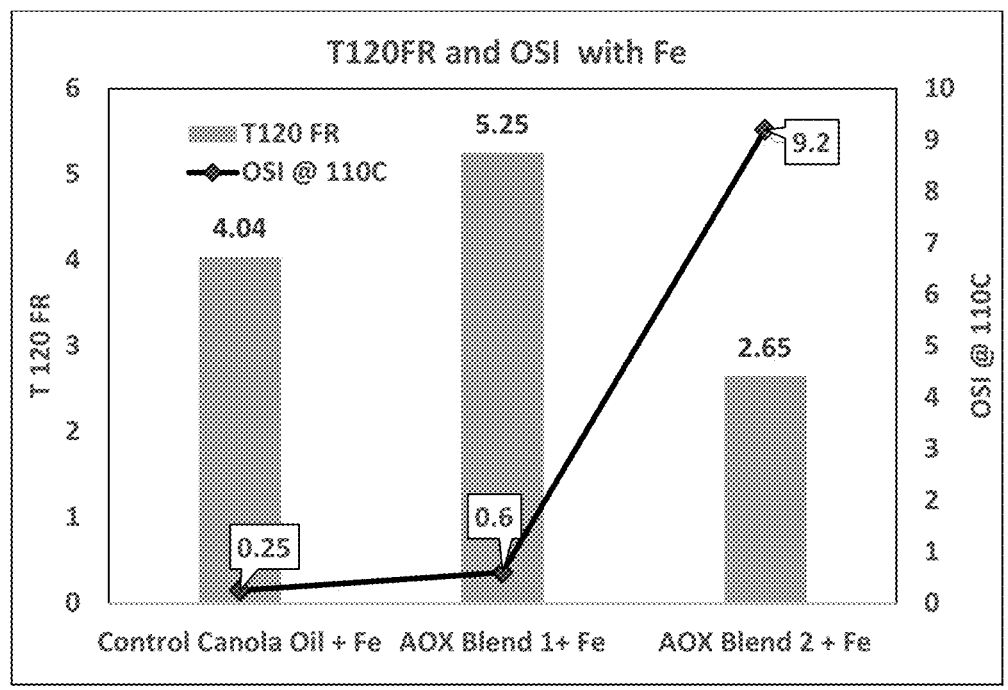
FIG. 26 shows the oxidative stability index of oil and containing an antioxidant containing microemulsion and other compositions over time.

FIGS. 25 and 26 show the comparison of antioxidant blend 1 (AOX 1) and antioxidant blend 2 (AOX 2) in the presence and absence of iron and the effects on free radical concentration at 175 minutes (T175 FR) and OSI at 110° C. The results of the in the Figures show that the microemulsion was effective in providing the chelating effect of iron and protecting the oil from oxidation.

While this invention has been particularly shown and described with references to exemplary embodiments thereof, it will be understood by those skilled in the art that various changes in form and details may be made therein without departing from the scope of the invention encompassed by the appended claims.

What is claimed is:

1. A microemulsion comprising:
   (i) a plant-based antioxidant, wherein the plant-based antioxidant is selected from the group consisting of green tea extract, mint extract, rosemary, apple, acerola, olive, curcumin, phenolic acids, phenolic diterpenes, flavonoids, volatile oils, limonene, and combinations of any thereof;
   (ii) water;
   (iii) at least one surfactant, wherein the at least one surfactant includes lecithin;
   (iv) mono/diglycerides from medium chain triglycerides;
   (v) ascorbic acid present in a range between 2 and 10 percent by weight;
   (vi) mixed tocopherols; and
   (vii) a non-polar solvent,
   wherein a weight ratio of the mixed tocopherols to the lecithin in the microemulsion is within a range between 1:4 and 1:1.

2. The microemulsion of claim 1, wherein the plant-based antioxidant is water soluble.

3. The microemulsion of claim 1, wherein the plant-based antioxidant is oil soluble.

4. The microemulsion of claim 1, wherein the at least one surfactant is a single surfactant of lecithin.

5. The microemulsion of claim 1, further comprising a co-surfactant.

6. The microemulsion of claim 1, further comprising an organic acid selected from the group consisting of citric acid, lactic acid, and combinations of any thereof.

7. The microemulsion of claim 1, wherein the non-polar solvent is selected from the group consisting of a vegetable oil, medium chain triglycerides, and combinations thereof.

8. The microemulsion of claim 5, wherein the co-surfactant is selected from the group consisting of mono and diglycerides, polysorbates, sorbitan esters, polyglyceril esters, sucrose esters, alkyl polyglucosides, alkyl polyglycosides, polaxmers, pluronics, ethoxylated fatty acids, ethoxylated monoglycerides, propylene glycol, polyethylene glycol esters, sodium lauryl sulfate (SLS), quillaja, rhamnolipids, sophorolipids, sucrose esters, polyglycerol esters, saponins, derivatives of any thereof, and combinations of any thereof.

9. The microemulsion of claim 1, further comprising at least one chelator.

10. The microemulsion of claim 9, wherein the at least one chelator is selected from the group consisting of ethylene diamine tetra acetic acid, citric acid, phytic acid, phospholipids, flavonoids, and combinations of any thereof.

11. A method of preventing or slowing oxidation in a food/feed product or food/feed ingredient, the method comprising incorporating the microemulsion of claim 1 with the food/feed product or the food/feed ingredient.

12. The method of claim 11, wherein the food/feed product or the food/feed ingredient comprises an oil or a fat.

13. The method of claim 11, wherein the plant-based antioxidant is present in the food/feed product or the food/feed ingredient at a concentration of between about 100 ppm and 4000 ppm.

14. The method of claim 11, further comprising mixing a chelator with the food/feed product, the food/feed ingredient, the microemulsion, or combinations of any thereof.

15. A process of loading a microemulsion with an antioxidant, the process comprising:
   mixing a plant-based antioxidant with water, thus producing an aqueous phase;
   mixing a non-polar solvent with (i) at least one surfactant, (ii) mono/diglycerides from medium chain triglycerides, (iii) ascorbic acid, and (iv) mixed tocopherols, thus producing a non-polar phase; and
   mixing the aqueous phase with the non-polar phase, thus producing the microemulsion;
   wherein the plant-based antioxidant is selected from the group consisting of green tea extract, mint extract, rosemary, apple, acerola, olive, curcumin, phenolic acids, phenolic diterpenes, flavonoids, volatile oils, limonene, and combinations of any thereof;
   wherein the at least one surfactant includes lecithin, wherein the ascorbic acid is present in the microemulsion in a range between 2 and 10 percent by weight, and wherein a weight ratio of the mixed tocopherols to the lecithin in the microemulsion is within a range between 1:4 and 1:1.

16. The method according to claim 15, further comprising mixing an organic acid with the antioxidant and the water.

17. The method according claim 15, wherein the at least one surfactant comprises lecithin and a co-surfactant.

18. The method according to claim 15, wherein the non-polar solvent is selected from the group consisting of a vegetable oil, medium chain triglycerides, and combinations thereof.

19. The microemulsion of claim 1, wherein the plant-based antioxidant is present in a range between 10 and 40 percent by weight.

\* \* \* \* \*